July 28, 1964  J. MARTIN  3,142,219
SELECTIVELY OPERABLE LINE CUTTING DEVICE
Filed Feb. 15, 1963  2 Sheets-Sheet 1

Inventor
JAMES MARTIN
By Kurt Kelman
Agent

July 28, 1964  J. MARTIN  3,142,219

SELECTIVELY OPERABLE LINE CUTTING DEVICE

Filed Feb. 15, 1963  2 Sheets-Sheet 2

Inventor
JAMES MARTIN
By Kurt Kelman
agent

United States Patent Office 3,142,219
Patented July 28, 1964

3,142,219
SELECTIVELY OPERABLE LINE CUTTING DEVICE
James Martin, Southlands Manor, Southlands Road,
Denham, near Uxbridge, Middlesex, England
Filed Feb. 15, 1963, Ser. No. 258,834
Claims priority, application Great Britain May 18, 1962
3 Claims. (Cl. 83—639)

This invention concerns line-cutting devices and in particular line-cutting devices adapted for severing, when required, a drawline extending between a drogue and the personal parachute of the occupant of an aircraft or like ejection seat as, for example, disclosed in Patent Nos. 3,036,798 and 3,036,799.

An object of the present invention is to provide an improved line-cutting device, primarily for drogue drawline-severing purposes on an aircraft or like ejection seat, that is adapted for operation selectively by two sources of energy.

A line-cutting device in accordance with the present invention comprises a cutting-head having an open-sided anvil-forming recess to receive a portion of a line to be cut by the device, a knife mounted for guided movement through said recess transversely thereof for severing said line, and a cylinder housing a piston operatively connected to said knife. One selectively operable driving means for displacing the piston in the line-cutting direction includes a pressure fluid inlet in said cylinder for admission of pressure fluid thereto to move said piston and said knife in the line-cutting direction, a pressure fluid outlet being located in said cylinder to be uncovered by the piston during movement thereof in said line-cutting direction so as to place said outlet in communication with said inlet. The other driving means includes a combustion chamber adapted to receive a detonatable explosive cartridge and communicating with said cylinder so that gases generated by explosion of a cartridge in such chamber move the piston and knife in said line-cutting direction, and a firing mechanism for detonating a cartridge in said combustion chamber.

In such a device the piston may be moved in the line-cutting direction to cause the severing, by the knife, of a line in the cutting-head recess either by the admission of pressure fluid (e.g. compressed air) to said cylinder via said inlet or by the detonation of a cartridge in said combustion chamber by the operation of said firing mechanism. Accordingly the device may be operated by either of two independent systems, one co-acting with the firing mechanism and the other controlling the application of pressure fluid to said pressure fluid inlet of the cylinder.

The combustion chamber may be directly associated with the said cylinder and form, for instance, an extension of one end of the latter; alternatively the combustion chamber may be situated remotely from the cylinder and communicate therewith by an appropriate conduit. The firing mechanism may comprise a spring-loaded firing pin retained, against the spring-loading, clear of the cartridge by a sear that may be withdrawn first to retract and then to release the firing pin to be impelled by the spring-loading against the detonator of the cartridge to fire same.

A line-cutting device in accordance with the invention is particularly suitable for application to an aircraft ejection seat forming part of an escape system as disclosed in my co-pending application Serial No. 258,830 of even date and adapted to meet the conflicting requirements of escape from an aircraft in, respectively, an air environment and when submerged. In preferred embodiments of the escape system disclosed in said application, fluid pressure-operated devices carry out a series of functions during operation of the system in escape from a submerged aircraft and one of the functions that may be required of such system is the severing of the drawline that connects the drogue(s) to the seat and to the seat occupant's personal parachute at a point between the latter and the drawline attachment to the seat since, if this drawline were not severed, the attachment of the seat occupant's parachute to the seat and drogue(s) could be detrimental to his survival when carried clear of the aircraft by ejection of the seat.

A line-cutting device in accordance with the present invention is particularly suited to performing this drawline severing function in such an escape system in that its operation can be effected by the pressure fluid employed to actuate other fluid pressure-operated devices of the system and the operation of the line-cutting device by such pressure fluid can be arranged to occur at the desired instant merely by connecting the pressure fluid inlet of its cylinder to the source of pressure fluid via a valve that is opened at the appropriate instant, e.g. by a device performing a preceding function in the series of functions. Moreover, the pressure fluid escaping from the outlet of the cylinder of the line-cutting device, when the piston has performed its line-cutting movement, may be ducted to other devices of the system intended to perform functions that are to occur after the drawline severing function.

When said device constitutes, as above indicated, part of an escape system as disclosed in my aforesaid application, the firing mechanism may be associated with manual arrangements for releasing the seat occupant's safety harness and/or leg and/or arm restraining devices, so as to result in drawline severing when the seat occupant wishes to free himself from the seat by the use of such manual arrangements. Alternatively, the firing mechanism may be associated with the seat occupant's personal parachute so as to be operated, upon deployment of the latter, to sever the drawline in the course of escape in an air environment by use of the ejection seat should, for some reason (e.g. owing to damage) the drogue(s) have failed to deploy and free the drawline from the cutting-head of the device, or should the drawline have remained attached to the seat after it should have been released therefrom.

A typical embodiment of the invention is illustrated in the accompanying drawings in which.

Figure 1:
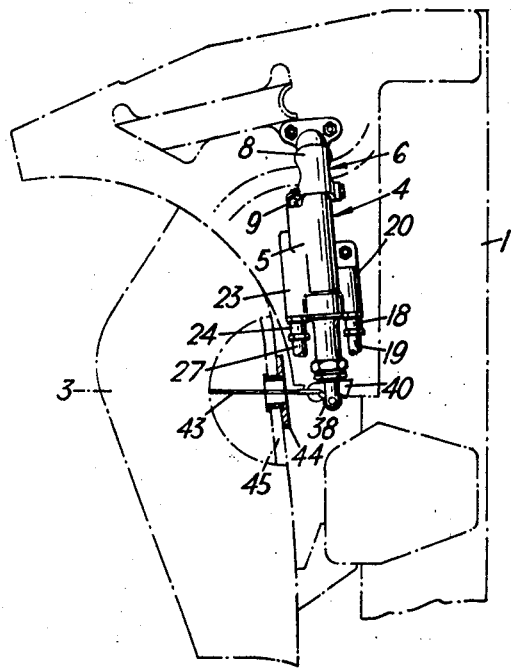
FIGURE 1 illustrates a line-cutting device constructed in accordance with the invention, the device being shown mounted on the upper part of an aircraft ejection seat for the purpose of severing, when required, a drogue drawline forming part of the seat equipment.

The illustated line-cutting device is adapted to be mounted, as diagrammatically represented in FIGURE 1, on the upper part of an aircraft ejection seat 1, shown in broken lines, for the purpose of severing, when required, a drogue drawline that extends from the drogue system (not shown) to the ripping mechanism of the seat occupant's personal parachute the pack of which is indicated at 3 in FIGURE 1.

As is well understood such drawline is releasably secured, between its ends, to the upper part of the ejection seat 1 by means of a shackle (not shown) that is opened during the ejection sequence to free the drogue system from the seat 1 concurrently with release of the occupant's seat harness, whereby the drag of the drogue system is applied to the ripping mechanism of the occupant's personal parachute to cause deployment of the latter.

The line-cutting device generally indicated at 4 in FIGURE 1 comprises a body 5 one end of which is formed as a cutting-head 6 having an open-sided anvil forming recess 7 adapted to receive a portion of the drawline to be cut by the device, the line being retained in the recess 7 by means of a closure flap 8 pivotally mounted on the body 5 and held in its recess-closing position by means of a plunger 9 engaging a lug 10 on the closure flap 8, the plunger 9 being subject to the thrust of a spring 11 disposed within the plunger 9 and engaging the bottom of a bore 12, in body 5, in which the plunger 9 is slidable. The closure flap 8 serves to hold the drawline, when slack, in the recess 7 in position for severing by the operation of the device whilst permitting the drawline to be withdrawn from the recess 7 when subject to force acting in the appropriate direction, for instance when the drawline is released from the seat 1 in the course of a normal ejection sequence and the drag of the drogue system is applied to that portion of the drawline extending through the recess 7.

Figure 3:
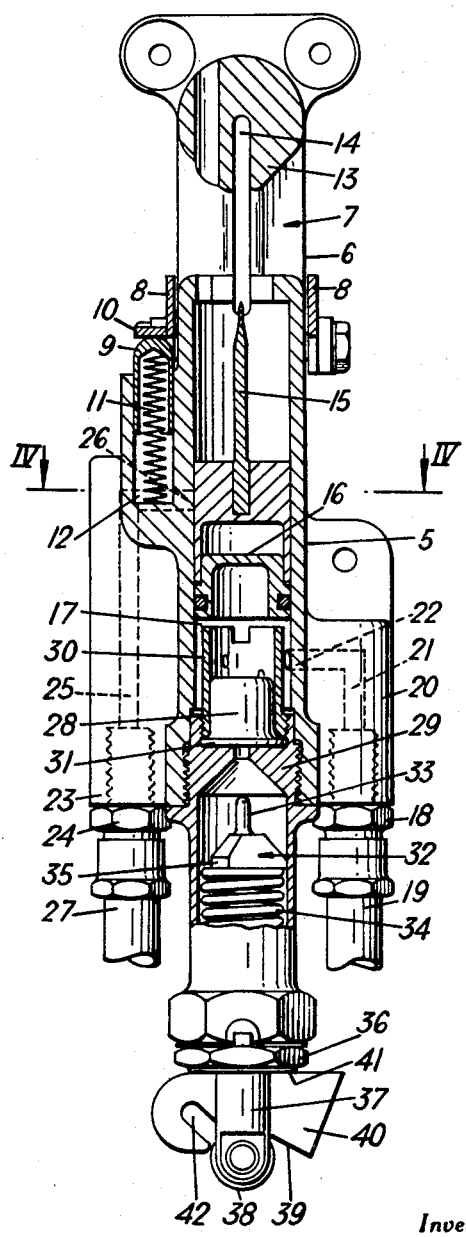
FIGURE 3 is a part-sectional front elevation of the device.

The side of the recess 7 remote from the body 5 of the device is formed as an anvil 13 having a slot 14 to receive the blade 15 of a knife mounted on a piston 16 movable in a cylinder 17 formed in the body 5 of the device. Normally the piston 16 is so disposed in the cylinder 17 that the knife blade 15 is located within the body 5, as shown in FIGURE 3, and does not extend into the recess 7. However, upon movement of piston 16 in the cylinder 17 towards the anvil 13, the knife blade 15 travels through the recess 7 and into the slot 14 of the anvil 13 to effect severing of the drawline, should this be situated in the recess 7 at that time.

Such movement of the piston 16 and knife blade 15 relatively to the cylinder 17 is referred to herein as movement in the "line-cutting direction" and is adapted to be effected by two different forms of pressure-fluid energy.

In the illustrated embodiment, one such form of pressure fluid energy is that derived from a source such as a storage container (not shown) for compressed air that is connected to a connection 18 as by conduit 19 on a boss 20 on one side of the body 5 of the device, the boss 20 having therein a passage 21 that communicates with a port 22 in the wall of cylinder 17, whereby compressed air from said source may be conducted into the cylinder 17 to drive piston 16 in the line-cutting direction.

The other side of the body 5 has a boss 23 with a pressure fluid outlet connection 24 and a passage 25 communicating with a port 26 in the wall of cylinder 17, the port 26 being so disposed as to be covered by piston 16 until the latter has performed its stroke in the line-cutting direction.

The arrangement accordingly is such that the admission of pressure fluid such as compressed air to the cylinder 17 via port 22 will cause the piston 16 to perform its stroke in the line-cutting direction and, at the end of its stroke, to uncover port 26 to permit such pressure fluid to flow from port 22, via cylinder 17, to port 26 and thence to connection 24 for further utilization, if required, by a device (not shown) connected to such connection 24 by means of a pipe such as shown at 27.

The other form of pressure-fluid energy referred to hereinabove is constituted by expansive gases produced by firing of a cartridge 28 secured in a breech 29 that is screw-threadedly secured in the end of body 5 remote from the anvil 13 and which closes the end of the cylinder 17 therein. Cartridge 28 is retained in the breech 29 by means of a retaining ring 30 screw-threadedly fitted in the end of the breech and engaging a flange 31 at the base of the cartridge.

The breech 29 is of generally tubular form and houses a plunger 32 mounting a firing pin 33 and urged towards cartridge 28 by means of a spring 34. The spring 34 encircles the plunger 32, one end of the spring abutting a collar 35 on the plunger immediately behind the firing pin 33 and the other end of the spring 34 engaging a closure plug 36 at the end of the breech 29. The plunger 32 extends through the plug 36 and has a bifurcated end part 37 mounting a roller 38 that engages the ramped surface 39 of a wedge-like sear 40 which is positioned between the limbs of the bifurcated end part 37 of the plunger and rides on the external face 41 of the plug 36. The sear 40 is fromed with a hook 42 for connection to a firing cable 43 (FIGURE 1) by means of which the sear 40 may be withdrawn from between the limbs of the bifurcated end part 37 of the plunger so as to cause retraction of the plunger 32, to compress spring 34, followed by release of the plunger to enable spring 34 to impel the firing pin 33 against the percussion cap of cartridge 28.

As indicated in FIGURE 1, the firing cable 43 is led through a bush 44 in the backrest 45 of the ejection seat 1 and is coupled to the parachute pack 3 in such manner that deployment of the parachute or forward movement of the pack 3 (as a result, for instance, of the seat occupant evacuating the seat 1 whilst attached to the parachute pack 3) will result in withdrawal of sear 40 to fire cartridge 28 and so cause movement of piston 16 in its line-cutting direction, thereby to sever the drogue drawline in the event that this has not previously been withdrawn clear of the recess 7 of the cutting head 6 of the device.

Figure 4:
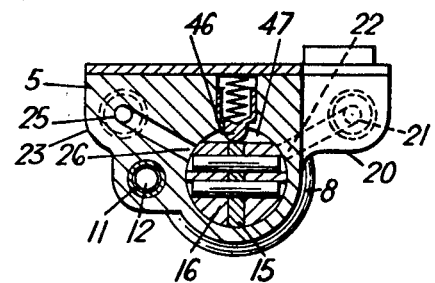
FIGURE 4 is a section on line IV—IV of FIGURE 3.
Figure 2:
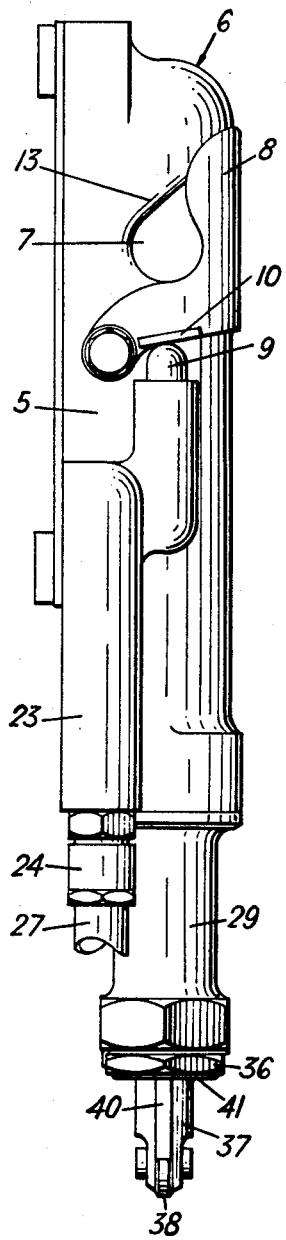
FIGURE 2 is a side elevation of the line-cutting device.

In order to prevent unwanted movement of the piston 16 and knife blade 15 in cylinder 17 and the possibility of damage to the drawline by the blade 15, for instance as a result of acceleration forces on the device during maneuvering of an aircraft having an ejection seat equipped with the described line-cutting device, the body 5 is preferably, as shown in FIGURE 4, equipped with a spring-loaded plunger 46 that seats in a notch 47 in the piston 16 to hold this in the position shown in FIGURE 3 until positively displaced in its line-cutting direction by the application of fluid pressure to the piston.

I claim:

1. A line-cutting device comprising a cutting-head having an open-sided anvil-forming recess to receive a portion of a line to be cut by the device, a knife mounted for guided movement through said recess transversely thereof for severing said line, a cylinder, a piston separating the cylinder into two chambers and being movably mounted in said cylinder for displacement in a line-cutting direction, said piston being operatively connected to said knife, and two selectively operable driving means for displacing the piston in the line-cutting direction, one of said driving means including a pressure fluid inlet in communication with one of said cylinder chambers for admission of pressure fluid thereto to move said piston and said knife in the line-cutting direction, a pressure fluid outlet being located in said cylinder located to be uncovered by the piston during movement thereof in said line-cutting direction so as to place said outlet in communication with said inlet, and the other driving means including a detonatable explosive cartridge mounted in a combustion chamber communicating with said one cylinder chamber so that gases generated by explosion of the cartridge in said combustion chamber move the piston and knife in said line-cutting direction, and a firing mechanism for detonating the cartridge in said combustion chamber.

2. A line-cutting device according to claim 1, said combustion chamber constituting an extension of said one cylinder chamber.

3. A line-cutting device according to claim 2, wherein said firing mechanism comprises a spring-loaded firing pin and a sear retaining said pin and withdrawable first to retract said firing pin against said spring loading and then to release the firing pin.

References Cited in the file of this patent

UNITED STATES PATENTS

| | | |
|---|---|---|
| 1,627,185 | Krammer | May 3, 1927 |
| 3,036,798 | Martin | May 29, 1962 |